Patented Jan. 13, 1942

2,269,998

UNITED STATES PATENT OFFICE 2,269,998

PROCESS

Edward Peter Czerwin, Wilmington, Del., assignor to E. I. du Pont de Nemours & Company, Wilmington, Del., a corporation of Delaware No Drawing. Application January 31, 1940, Serial No. 316,640

5 Claims. (Cl. 260—406)

This invention relates to the production of carboxylic acids, and more particularly to the production of dicarboxylic acids by the oxidation of hydroxy acid esters.

Dicarboxylic acids have hitherto been obtained from naturally occurring fats and oils largely by a process which involves the steps of saponifying the natural fat, isolating the fatty acid, and oxidizing the same. When attempts have been made to oxidize directly the glyceride, for example, castor oil, the results have uniformly been less successful than those obtained in the oxidation of the fatty acid itself.

This invention has as an object the provision of a process for the preparation of polymethylene dicarboxylic acids of 11 and 12 carbon atoms. A further object is the provision of a process for the preparation of useful compounds from glycerides. Another object is the preparation of dicarboxylic acids from glycerides in good yields. Other objects will appear hereinafter.

These objects are accomplished by the following invention wherein an ester of 12-hydroxystearic acid is oxidized to dicarboxylic acids of 11 and 12 carbon atoms by means of nitric acid under conditions set forth below in greater detail.

The more detailed practice of the invention is illustrated by the following example, wherein parts given are by weight. There are of course many forms of the invention other than this specific embodiment.

Example

The oxidizing agent, 1950 parts of 70% nitric acid containing 0.5 parts ammonium vanadate, is heated to about 90° C. in a reaction vessel equipped with a mechanical stirrer, reflux condenser, and heated addition means. Molten 12-hydroxystearin, 675 parts, is then added in small portions over a six hour period, the reaction mixture being stirred vigorously throughout. Oxidation begins immediately as evidenced by the evolution of red nitrogen oxide fumes. The stirring and heating is continued for an additional two hours and the reaction mixture is then cooled to room temperature. The crude, white, crystalline product is filtered, washed with hot water, and air dried. The combined yield from two such oxidations is 1002 parts of crude acids. The mixture of acids is recrystallized from benzene to yield 565 parts of crystalline product, M. P. 95–100° C., and 437 parts of residue which is partly crystalline and partly liquid.

The crude product, which consists mainly of approximately equal amounts of undecanedioic and dodecanedioic acids, may be purified as above by recrystallization; or it may be esterified, the esters fractionated under reduced pressure, and the purified acids recovered by saponification. The esterification method is more suitable if pure undecanedioic and dodecanedioic acids are desired. The ethyl esters of the crude oxidation product boil over a range from 120–160° at 2 mm., the fractions 140–143°/2 mm. and 154–157°/2 mm. representing the 11 and 12 carbon acid, respectively. The melting points of the purified acids are as follows: Undecanedioic acid, M. P. 110°; dodecanedioic acid, M. P. 123°.

In carrying out the oxidation described by this invention, it is not necessary to melt the hydroxystearin prior to its introduction into the nitric acid, though this procedure is convenient and desirable. The reaction may be conducted at temperatures from 85° C. to the boiling point of the oxidizing agent, the duration of the reaction being governed by the time required for the reaction mixture to substantially cease evolving red nitrogen oxide fumes. The amount of nitric acid (100%) basis) may be 1.5 to 2.5 times the weight of 12-hydroxystearin used, and the strength of the nitric acid preferably should be over 60%. The use of a catalyst, for example, the vanadium catalyst of the example, is recommended although it is not essential, since in the absence of the catalyst the reaction takes place, but at a lower rate.

While the example shows the process applied to the glyceride of 12-hydroxystearic acid, which represents the preferred initial material for reasons of cost, convenience and availability, the invention is applicable to any ester of 12-hydroxystearic acid whether with a monohydric or polyhydric alcohol for example, the methyl, ethyl, cyclohexyl, benzyl, methoxyethyl, and ethylene glycol esters.

This invention is useful in the manufacture of aliphatic dibasic acids, which are of industrial importance as ingredients in the formulation of plasticizers, resins, polymers and other organic chemical products.

A great and unsuspected advantage of the present invention is its achievement of practicable yields of products without necessitating, as in the past, the saponification of the initial material and the isolation of the free hydroxy acid. This results in a material cheapening of the process. This result could not be predicted in the light of the prior art, since previous attempts to prepare carboxylic acids by oxidation of glycerides failed to give yields comparable in any way with the yields obtainable by oxidation of the corresponding free acids.

The above description and example are intended to be illustrative only. Any modification of or variation therefrom which conforms to the spirit of the invention is intended to be included within the scope of the claims.

What is claimed is:

1. Process of preparing dicarboxylic acids of eleven and twelve carbon atoms, which comprises oxidizing an ester of 12-hydroxystearic acid with nitric acid.

2. Process of preparing dicarboxylic acids which comprises oxidizing 12-hydroxystearin with nitric acid.

3. Process of preparing dicarboxylic acids which comprises heating 12-hydroxystearin with nitric acid of at least 60% strength, in amount from 1.5 to 2.5 times the weight of the 12-hydroxystearin, at a temperature of at least 85° C.

4. Process of claim 3 wherein a catalyst is used.

5. Process of claim 3 wherein a vanadium catalyst is used.

EDWARD PETER CZERWIN.